United States Patent
Byun et al.

(10) Patent No.: US 10,327,156 B2
(45) Date of Patent: Jun. 18, 2019

(54) RESOURCE ALLOCATION METHOD AND SIGNAL PROCESSING METHOD OF TERMINAL

(71) Applicant: LG ELECTRONICS INC., Seoul (KR)

(72) Inventors: Ilmu Byun, Seoul (KR); Hyunsoo Ko, Seoul (KR); Kungmin Park, Seoul (KR); Heejeong Cho, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 15/324,248

(22) PCT Filed: Jul. 15, 2014

(86) PCT No.: PCT/KR2014/006344
§ 371 (c)(1),
(2) Date: Jan. 5, 2017

(87) PCT Pub. No.: WO2016/010167
PCT Pub. Date: Jan. 21, 2016

(65) Prior Publication Data
US 2017/0201894 A1    Jul. 13, 2017

(51) Int. Cl.
*H04W 16/28* (2009.01)
*H04W 16/30* (2009.01)
(Continued)

(52) U.S. Cl.
CPC ............ *H04W 16/32* (2013.01); *H04B 1/713* (2013.01); *H04W 72/048* (2013.01); *H04W 72/10* (2013.01)

(58) Field of Classification Search
CPC .......................................... H04W 16/28–16/32
(Continued)

(56) References Cited

U.S. PATENT DOCUMENTS 5,649,292 A * 7/1997 Doner .................. H04W 16/02
455/447
5,901,355 A * 5/1999 Doner .................. H04W 16/12
455/447

(Continued)

FOREIGN PATENT DOCUMENTS

EP          1418776 B1    3/2006
KR    1020100094765 A    8/2010
(Continued)

OTHER PUBLICATIONS

PCT International Application No. PCT/KR2014/006344, International Search Report dated Mar. 30, 2015, 2 pages.

*Primary Examiner* — James M Perez
(74) *Attorney, Agent, or Firm* — Lee, Hong, Degerman, Kang & Waimey

(57) ABSTRACT

A resource allocation method according to the present invention may comprise the steps of: allocating a signal of an external resource to a predetermined resource according to a preconfigured resource allocation frame structure by a first base station governing a first cell; allocating a signal of an internal resource to the resource according to the resource allocation frame structure by a second base station governing a second cell adjacent to the first cell; and frequency-hopping the signal of the internal resource by the second base station when the signal of the internal resource overlaps the signal of the external resource. Accordingly, proposed is a resource allocation method capable of stably receiving a signal even when a terminal moving in a dense small cell structure is located at a cell edge, that is, an inter-cell boundary area.

4 Claims, 26 Drawing Sheets

(51) Int. Cl.
*H04W 16/32* (2009.01)
*H04B 1/713* (2011.01)
*H04W 72/10* (2009.01)
*H04W 72/04* (2009.01)

(58) Field of Classification Search
USPC ...... 455/39, 403, 422.1, 446–449, 500, 507, 455/514, 517, 524
See application file for complete search history.

(56) References Cited

U.S. PATENT DOCUMENTS

| | | | | | |
|---|---|---|---|---|---|
| 5,930,716 | A * | 7/1999 | Sonetaka | ............... | H04W 16/06 370/337 |
| 6,078,814 | A * | 6/2000 | Jeffries | ................. | H04W 16/02 455/447 |
| 6,151,310 | A * | 11/2000 | Dent | ....................... | H01Q 1/246 370/330 |
| 6,424,836 | B1 * | 7/2002 | Gil | ........................ | H04W 16/18 370/329 |
| 8,111,789 | B2 * | 2/2012 | Kent | ................... | H04L 25/0204 342/377 |
| 8,259,644 | B2 * | 9/2012 | Choi | ................... | H04W 72/048 370/321 |
| 8,374,620 | B2 * | 2/2013 | Matsuzawa | ........... | H04W 16/12 370/328 |
| 8,761,303 | B2 * | 6/2014 | Griot | .................. | H04L 27/2607 375/135 |
| 8,792,573 | B2 * | 7/2014 | Kim | ..................... | H04B 7/0404 375/261 |
| 8,917,796 | B1 * | 12/2014 | Mayrench | ............. | H04L 5/0028 375/260 |
| 9,001,918 | B2 * | 4/2015 | Taori | .................. | H04L 27/2626 375/137 |
| 9,425,880 | B2 * | 8/2016 | Kim | ..................... | H04L 27/261 |
| 9,571,322 | B2 * | 2/2017 | Bae | ..................... | H04L 27/2627 |
| 10,051,484 | B2 * | 8/2018 | Shen | ..................... | H04W 16/28 |
| 10,154,507 | B2 * | 12/2018 | Byun | .................... | H04W 16/32 |
| 2002/0034158 | A1 * | 3/2002 | Wang | .................... | H04L 5/0032 370/203 |
| 2003/0052819 | A1 * | 3/2003 | Jacomb-Hood | ...... | H01Q 3/2611 342/379 |
| 2003/0157897 | A1 * | 8/2003 | Maeda | ................... | H01Q 1/246 455/67.13 |
| 2004/0057410 | A1 * | 3/2004 | Kaipiainen | ........... | H04W 84/12 370/338 |
| 2004/0106412 | A1 * | 6/2004 | Laroia | .................. | H04W 16/12 455/448 |
| 2005/0073973 | A1 * | 4/2005 | Laroia | .................... | H04L 1/007 370/329 |
| 2005/0085265 | A1 * | 4/2005 | Laroia | .............. | H04W 36/0072 455/560 |
| 2005/0152473 | A1 * | 7/2005 | Maltsev | ................. | H04L 12/56 375/299 |
| 2005/0233752 | A1 * | 10/2005 | Laroia | .................. | H04L 5/0007 455/450 |
| 2006/0055586 | A1 * | 3/2006 | Kuji | ....................... | G01S 13/765 342/32 |
| 2007/0077934 | A1 * | 4/2007 | Chindapol | ............ | H04W 16/02 455/447 |
| 2008/0139231 | A1 * | 6/2008 | Jalil | ....................... | H04W 52/04 455/509 |
| 2008/0171516 | A1 * | 7/2008 | Kakura | .................. | H04B 7/086 455/63.4 |
| 2008/0232320 | A1 * | 9/2008 | Lee | ....................... | H04W 16/10 370/329 |
| 2009/0082002 | A1 * | 3/2009 | Kim | .................... | H04L 5/0091 455/418 |
| 2009/0088083 | A1 * | 4/2009 | Fujii | .................... | H04W 52/242 455/69 |
| 2009/0215401 | A1 * | 8/2009 | Yoon | ..................... | H04B 7/0617 455/67.14 |
| 2010/0003998 | A1 * | 1/2010 | Hamabe | ................ | H04W 16/12 455/452.1 |
| 2010/0027489 | A1 * | 2/2010 | Matsuzawa | ........... | H04W 16/12 370/329 |
| 2010/0165914 | A1 * | 7/2010 | Cho | ..................... | H04B 7/0695 370/328 |
| 2010/0210276 | A1 * | 8/2010 | Jang | .................. | H04W 72/0433 455/450 |
| 2010/0220666 | A1 * | 9/2010 | Imamura | ............. | H04W 74/002 370/329 |
| 2010/0265924 | A1 * | 10/2010 | Yong | .................... | H04B 7/0695 370/336 |
| 2011/0151923 | A1 * | 6/2011 | Mesecher | .............. | H04B 7/086 455/550.1 |
| 2012/0028596 | A1 * | 2/2012 | Yamada | ................... | H01Q 3/26 455/337 |
| 2012/0252469 | A1 * | 10/2012 | Okino | ................... | H04W 16/10 455/449 |
| 2013/0005390 | A1 * | 1/2013 | Oyama | .................. | H01Q 1/246 455/524 |
| 2013/0059619 | A1 * | 3/2013 | Kim | .................... | H04W 72/046 455/509 |
| 2013/0155847 | A1 * | 6/2013 | Li | ......................... | H04W 24/04 370/225 |
| 2013/0273965 | A1 * | 10/2013 | Jechoux | ................ | H04W 88/06 455/552.1 |
| 2014/0004869 | A1 * | 1/2014 | Jung | .................... | H04B 7/0617 455/452.1 |
| 2014/0011468 | A1 * | 1/2014 | Park | .................... | H04B 7/0802 455/272 |
| 2014/0018115 | A1 * | 1/2014 | Zhuang | ................. | H04B 7/024 455/501 |
| 2014/0105049 | A1 * | 4/2014 | Kim | ....................... | H04W 24/10 370/252 |
| 2014/0177607 | A1 * | 6/2014 | Li | ........................ | H04B 7/0617 370/336 |
| 2015/0094076 | A1 * | 4/2015 | Inoue | .................... | H04W 16/28 455/452.1 |
| 2015/0263424 | A1 * | 9/2015 | Sanford | ................. | H01Q 3/46 342/371 |
| 2017/0006629 | A1 * | 1/2017 | Jung | .................... | H04W 72/046 |
| 2017/0099673 | A1 * | 4/2017 | Byun | .................... | H04W 16/32 |
| 2017/0215152 | A1 * | 7/2017 | Byun | ..................... | H04B 7/02 |
| 2017/0223744 | A1 * | 8/2017 | Qian | ..................... | H04W 74/0833 |
| 2017/0303262 | A1 * | 10/2017 | Yuan | .................... | H04W 64/00 |
| 2017/0310511 | A1 * | 10/2017 | Byun | ................... | H04W 72/082 |
| 2017/0318608 | A1 * | 11/2017 | Ryoo | .................. | H04W 74/0833 |

FOREIGN PATENT DOCUMENTS

| | | |
|---|---|---|
| KR | 1020110128477 A | 11/2011 |
| KR | 1020130025102 A | 3/2013 |
| KR | 1020140002403 A | 1/2014 |

\* cited by examiner

FIG. 6

| | RB 1 | RB 1 | ... | RB N | RB N |
|---|---|---|---|---|---|
| cell A | Priority 1 | Priority 2 | ... | Priority N-1 | Priority N |
| cell B | Priority N | Priority N-1 | ... | Priority 2 | Priority 1 |
| cell C | Inner | Inner | ... | Inner | Inner |

FIG. 7

| | Resource 1 | Resource 2 | Resource 3 | Resource 4 | Resource 5 | |
|---|---|---|---|---|---|---|
| cell A | Outer Priority 1 | Outer Priority 2 | Inner | Inner | Inner | |
| cell B | Outer Priority 2 | Inner | Outer Priority 1 | Inner | Inner | · · · |
| cell C | Inner | Outer Priority 1 | Outer Priority 2 | Inner | Inner | |
| | Pattern 1 | Pattern 2 | Pattern 3 | Pattern 4 | | |

FIG. 8

|  | Column 1 | Column 2 | Column 3 |  | Column 1 | Column 2 | Column 3 |
|---|---|---|---|---|---|---|---|
| cell A | Outer Priority 1 for AO-1 | Outer Priority 2 for AO-1 | Inner for AI-1 | ... | Outer Priority 1 for AO-1 | Outer Priority 2 for AO-1 | Inner for AI-2 |
| cell B | Outer Priority 2 for BO-1 | Inner for BI-1 | Outer Priority 1 for BO-1 | ... | Outer Priority 2 for BO-1 | Inner for BI-1 | Outer Priority 1 for BO-1 |
| cell C | Inner for CI-1 | Outer Priority 1 for CO-1 | Outer Priority 2 for CO-1 | ... | Inner for CI-2 | Outer Priority 1 for CO-1 | Outer Priority 2 for CO-1 |

Orthogonal resources →

FIG. 9A

|  | Pattern 1 | Pattern 2 | Pattern 3 | Pattern 4 | Pattern 5 |
|---|---|---|---|---|---|
| cell A | Outer Priority 1 | Outer Priority 2 | Inner Priority 2 | Inner Priority 1 | Inner Priority 1 or 2 |
| cell B | Outer Priority 2 | Inner Priority 2 | Outer Priority 1 | Inner Priority 1 | Inner Priority 1 or 2 |
| cell C | Inner Priority 2 | Outer Priority 1 | Outer Priority 2 | Inner Priority 1 | Inner Priority 1 or 2 |

Orthogonal resources →

FIG. 9B

| | | | | | |
|---|---|---|---|---|---|
| cell A | Outer Priority 1 | Outer Priority 2 | Inner Priority 1 | Inner Priority 2 | Inner Priority 1 or 2 |
| cell B | Outer Priority 2 | Inner Priority 1 | Outer Priority 1 | Inner Priority 2 | Inner Priority 1 or 2 |
| cell C | Inner Priority 1 | Outer Priority 1 | Outer Priority 2 | Inner Priority 2 | Inner Priority 1 or 2 |
| | Pattern 1 | Pattern 2 | Pattern 3 | Pattern 4 | Pattern 5 |

Orthogonal resources

FIG. 10

| | Column 1 | Column 2 | Column 3 | Column 4 | | |
|---|---|---|---|---|---|---|
| cell A | Outer Priority 1 for AO-1 | Outer Priority 2 for AO-1 | Inner Priority 2 for AI-1 | Inner Priority 1 for AI-1 | ... | Outer Priority 1 for AO-1 | Outer Priority 2 for AO-1 | Inner Priority 2 for AI-2 |
| cell B | Outer Priority 2 for BO-1 | Inner Priority 2 for BI-1 | Outer Priority 1 for BO-1 | Inner Priority 2 for BI-1 | ... | Outer Priority 2 for BO-1 | Inner Priority 2 for BI-2 | Outer Priority 1 for BO-1 |
| cell C | Inner Priority 2 for CI-1 | Outer Priority 1 for CO-1 | Outer Priority 2 for CO-1 | Inner Priority 1 for BI-1 | ... | Inner Priority 2 for CI-2 | Outer Priority 1 for CO-1 | Outer Priority 2 for CO-1 |

Orthogonal resources →

FIG. 11

| | Outer Priority 1 | Outer Priority 2 | Inner | Outer Priority 1 | Inner | Inner | Inner |
|---|---|---|---|---|---|---|---|
| cell A | Outer Priority 2 | Inner | Outer Priority 1 | Inner | Outer Priority 1 | Inner | Inner |
| cell B | Inner | Outer Priority 1 | Outer Priority 2 | Inner | Inner | Outer Priority 1 | Inner |
| cell C | Column 1 | Column 2 | Column 3 | Column 4 | Column 5 | Column 6 | Column 7 |

Orthogonal resources

FIG. 12

|  | Column 1 | Column 2 | Column 3 | Column 4 | Column 5 | Column 6 | Column 7 |
|---|---|---|---|---|---|---|---|
| cell A | Outer Priority 1 | Outer Priority 2 | Inner Priority 2 | Outer Priority 1 | Inner Priority 1 | Inner Priority 1 | Inner Priority 1 or 2 |
| cell B | Outer Priority 2 | Inner Priority 2 | Outer Priority 1 | Inner Priority 1 | Outer Priority 1 | Inner Priority 1 | Inner Priority 1 or 2 |
| cell C | Inner Priority 2 | Outer Priority 1 | Outer Priority 2 | Inner Priority 1 | Inner Priority 1 | Outer Priority 1 | Inner Priority 1 or 2 |

Orthogonal resources

FIG. 13

| | Column 1 | Column 2 | Column 3 | Column 4 | Column 5 | Column 6 | Column 7 |
|---|---|---|---|---|---|---|---|
| cell A | Outer Priority 1 | Outer Priority 2 | Inner Priority 1 | Outer Priority 1 | Inner Priority 1 | Inner Priority 2 | Inner Priority 1 or 2 |
| cell B | Outer Priority 2 | Inner Priority 1 | Outer Priority 1 | Inner Priority 2 | Outer Priority 1 | Inner Priority 1 | Inner Priority 1 or 2 |
| cell C | Inner Priority 1 | Outer Priority 1 | Outer Priority 2 | Inner Priority 1 | Inner Priority 2 | Outer Priority 1 | Inner Priority 1 or 2 |

Orthogonal resources

FIG. 14

| | | | | | | | |
|---|---|---|---|---|---|---|---|
| cell A | Outer Priority 1 for AO-1 | Outer Priority 2 for AO-1 | Inner for AI-1 | Outer Priority 1 for AO-1 | Inner for AI-1 | Inner for AI-1 | ... |
| cell B | Outer Priority 2 for BO-1 | Inner for BI-1 | Outer Priority 1 for BO-1 | Inner for BI-1 | Outer Priority 1 for BO-1 | Inner for BI-1 | |
| cell C | Inner for CI-1 | Outer Priority 1 for CO-1 | Outer Priority 2 for CO-1 | Inner for CI-1 | Inner for CI-1 | Outer Priority 1 for CO-1 | |

| | | | | | |
|---|---|---|---|---|---|
| Outer Priority 1 for AO-1 | Outer Priority 2 for AO-1 | Inner for AI-2 | Outer Priority 1 for AO-1 | Inner for AI-2 | Inner for AI-2 |
| Outer Priority 2 for BO-1 | Inner for BI-2 | Outer Priority 1 for BO-1 | Inner for BI-2 | Outer Priority 1 for BO-1 | Inner for BI-2 |
| Inner for CI-2 | Outer Priority 1 for CO-1 | Outer Priority 2 for CO-1 | Inner for CI-2 | Inner for CI-2 | Outer Priority 1 for CO-1 |

Orthogonal resources →

FIG. 15

|        | Column 1 | Column 2 | Column 3 | Column 4 | Column 5 | Column 6 |
|--------|----------|----------|----------|----------|----------|----------|
| cell A | Outer Priority 1 | Inner | Outer Priority 3 | Outer Priority 2 | Inner | Inner |
| cell B | Outer Priority 3 | Outer Priority 1 | Inner | Inner | Outer Priority 2 | Inner |
| cell C | Inner | Outer Priority 3 | Outer Priority 1 | Inner | Inner | Outer Priority 2 |

Orthogonal resources →

FIG. 16

| | Column 1 | Column 2 | Column 3 | Column 4 | Column 5 | Column 6 | Column 7 |
|---|---|---|---|---|---|---|---|
| cell A | Outer Priority 1 | Inner | Outer Priority 3 | Outer Priority 1 | Inner | Outer Priority 2 | Inner |
| cell B | Outer Priority 3 | Outer Priority 1 | Inner | Outer Priority 2 | Outer Priority 1 | Inner | Inner |
| cell C | Inner | Outer Priority 3 | Outer Priority 1 | Inner | Outer Priority 2 | Outer Priority 1 | Inner |

Orthogonal resources →

FIG. 19

|  | Column 1 | Column 2 | Column 3 | Column 4 | Column 5 | Column 6 |
|---|---|---|---|---|---|---|
| cell A | Priority 1 | Priority 2 | Priority 2 | Priority 1 | Priority 2 | Priority 1 |
| cell B | Priority 2 | Priority 1 | Priority 1 | Priority 2 | Priority 2 | Priority 1 |
| cell C | Priority 2 | Priority 1 | Priority 2 | Priority 1 | Priority 1 | Priority 2 |

Orthogonal resources →

FIG. 20

| | Orthogonal resources → | | | | |
|---|---|---|---|---|---|
| cell A | Priority 1 | Priority 2 | Priority 2 | Priority 2 | |
| cell B | Priority 2 | Priority 1 | Priority 2 | Priority 2 | ••• |
| cell C | Priority 2 | Priority 2 | Priority 1 | Priority 2 | |
| | Column 1 | Column 2 | Column 3 | Column 4 | |

FIG. 21

|  | Orthogonal resources → | | |
|---|---|---|---|
| cell A | Priority 1 | Priority 3 | Priority 2 |
| cell B | Priority 2 | Priority 1 | Priority 3 |
| cell C | Priority 3 | Priority 2 | Priority 1 |
|  | Column 1 | Column 2 | Column 3 |

RESOURCE ALLOCATION METHOD AND SIGNAL PROCESSING METHOD OF TERMINAL

CROSS-REFERENCE TO RELATED APPLICATIONS

This application is the National Stage filing under 35 U.S.C. 371 of International Application No. PCT/KR2014/006344, filed on Jul. 15, 2014, the contents of which are hereby incorporated by reference herein in their entirety.

BACKGROUND OF THE INVENTION

Field of the Invention

The present invention relates to a resource allocation method and a signal processing method of a terminal, and more particularly, to a resource allocation method to which a plurality of beamforming is applied, and a signal processing method of a terminal.

Related Art

Recently, commercialization of a long term evolution (LTE) system which is a next-generation wireless communication system has been supported earnestly. After recognizing necessity for supporting not only a voice service but also a large amount service with high quality in response to a user's demand while ensuring activity of a user of a terminal, the LTE system tends to be more rapidly increased than before. The LTE system provides a low transmission delay, a high transfer rate, and an improved system capacity and coverage.

With an introduction of such a high-quality service, there is a rapidly growing demand on a wireless communication service. Above all, capacity of a communication system must be increased to actively cope with this situation. A method of newly discovering an available frequency band and a method of increasing efficiency for a limited resource may be considered as an alternative of increasing communication capacity in a wireless communication environment.

As the method of increasing the efficiency for the limited resource, a so-called multi-antenna transmission/reception technique is actively developed in recent years with a remarkable attention, in which a spatial region for resource utilization is additionally ensured by placing a plurality of antennas to a transceiver to obtain a diversity gain or in which transmission capacity is increased by transmitting data in parallel through the respective antennas.

In a multi-antenna system, beamforming and precoding may be used as a method of increasing a signal to noise ratio (SNR). The beamforming and the precoding are used to maximize the SNR through feedback information in a closed-loop system capable of using the feedback information in a transmitting end.

SUMMARY OF THE INVENTION

One embodiment of the present invention proposes a resource allocation method capable of stably receiving a signal even when a mobile terminal is located at a cell edge, that is, an adjacent region between cells, in a dense small cell structure.

One embodiment of the present invention proposes a resource allocation method capable of performing beamforming having a plurality of beam widths.

Another embodiment of the present invention proposes a resource allocation method capable of performing beamforming having a different beam width according to an importance of a signal.

Another embodiment of the present invention proposes a resource allocation method for allocating resources orthogonal to each other by a plurality of base stations according to a pre-configured resource frame structure.

Another embodiment of the present invention proposes a resource allocation method for performing frequency hopping on a signal allocated to an inner resource.

According to one embodiment of the present invention, a resource allocation method is provided. The resource allocation method may include: allocating a signal of an outer resource to a specific resource according to a pre-configured resource allocation frame structure by a first base station governing a first cell; allocating a signal of an inner resource to the resource according to the resource allocation frame structure by a second base station governing a second cell adjacent to the first cell; and performing frequency hopping on the signal of the inner resource by the second base station when the signal of the inner resource overlaps with the signal of the outer resource.

The method may further include, if the first base station allocates a signal having a first beam width to the resource, allocating by a third base station governing a third cell adjacent to the first cell and the second cell a signal having a second beam width different from the first beam width to the resource according to the resource allocation frame structure. The signal having the first beam width may be a signal having a first priority, and the signal having the second beam width may be a signal having a second priority different from the first priority.

If the first priority is higher than the second priority, a beam width of the signal having the first priority may be greater than a beam width of the signal having the second priority.

If the first priority is higher than the second priority, transmit power of the signal having the first priority may be higher than transmit power of the signal having the second priority.

The signal having the first priority may be allocated to an outer resource of the first cell, and the signal having the second priority may be allocated to an outer resource of the third cell.

If the first base station allocates a signal having a priority n to the outer resource, where n is any one number in the range of 1 to N, the third base station may allocate a signal having a priority N+1−n to the outer resource.

The signal allocated to the inner resource may include a signal having a plurality of priorities. In the performing of the frequency hopping, a signal having a low priority may be subjected to the frequency hopping among signals allocated to the inner resource.

The first base station and the third base station may allocate more resources to a high-priority signal.

According to another embodiment of the present invention, a signal processing method of a terminal may include: receiving a first beam formed by a first base station governing a first cell according to a specific resource allocation frame structure for resource allocation and a second beam formed by a second base station governing a second cell adjacent to the first cell according to the resource allocation frame structure; and if a beam width of the first beam is greater than a beam width of the second beam, cancelling interference to the second beam by using reference information on the second beam. The frame structure may include information on a priority of the first beam to be allocated to the first cell and the second cell and a priority of the second beam. If the first beam having a priority n is allocated to a specific resource, where n is any one number in the range of 1 to N, the second beam having a priority other than the priority n may be allocated to the resource, where n is any one number in the range of 1 to N.

The first beam may be a signal allocated to an outer resource of the first cell, and the second beam may be a signal allocated to an outer resource of the second cell.

According to one embodiment of the present invention, proposed is a resource allocation method capable of stably receiving a signal even when a mobile terminal is located at a cell edge, that is, an adjacent region between cells, in a dense small cell structure.

According to one embodiment of the present invention, proposed is a resource allocation method capable of performing beamforming having a plurality of beam widths.

According to another embodiment of the present invention, proposed is a resource allocation method capable of performing beamforming having a different beam width according to an importance of a signal.

According to another embodiment of the present invention, proposed is a resource allocation method for allocating resources orthogonal to each other by a plurality of base stations according to a pre-configured resource frame structure.

According to another embodiment of the present invention, proposed is a resource allocation method for performing frequency hopping on a signal allocated to an inner resource.

BRIEF DESCRIPTION OF THE DRAWINGS

FIG. 6 shows a resource allocation frame structure according to an embodiment of the present invention.

FIG. 7 shows a resource allocation frame structure according to another embodiment of the present invention.

FIG. 8 shows a resource allocation frame structure according to another embodiment of the present invention.

FIG. 9a and FIG. 9b show a resource allocation frame structure according to another embodiment of the present invention.

FIG. 10 shows a resource allocation frame structure according to another embodiment of the present invention.

FIG. 11 shows a resource allocation frame structure according to another embodiment of the present invention.

FIG. 12 shows a case where a signal of an inner resource has a plurality of priorities in the resource allocation frame structure of FIG. 11.

FIG. 13 shows a case where a signal of an inner resource has a plurality of priorities in the resource allocation frame structure of FIG. 11.

FIG. 14 shows a resource allocation frame structure according to another embodiment of the present invention.

FIG. 15 shows a resource allocation frame structure according to another embodiment of the present invention.

FIG. 16 shows a resource allocation frame structure according to another embodiment of the present invention.

FIG. 19 shows a resource allocation frame structure according to another embodiment of the present invention.

FIG. 20 shows a resource allocation frame structure according to another embodiment of the present invention.

FIG. 21 shows a resource allocation frame structure according to another embodiment of the present invention.

DESCRIPTION OF EXEMPLARY EMBODIMENTS

Figure 1A:
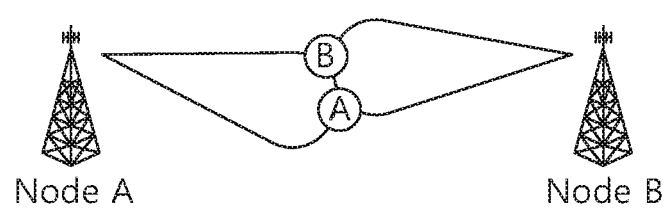
FIG. 1a shows a signal of an adjacent region between cells in case of using wide beamforming.

Since the present invention may have various modifications and diverse embodiments, only specific embodiments are exemplarily illustrated in the drawings and will be described in detail. However, the present invention should not be construed as being limited to the specific embodiments set forth herein. The terminology used herein is for the purpose of describing particular embodiments only and is not intended to be limiting of the invention Hereinafter, exemplary embodiments of the present invention will be described in detail with reference to the accompanying drawings. Wherever possible, the same reference numbers will be used throughout the drawings to refer to the same or like parts. In the following description, well-known functions or constructions are not described in detail since they would obscure the invention in unnecessary detail.

The present specification is described based on a communication network. A task achieved in the communication network may be achieved in a process of controlling a network and transmitting data in a system (e.g., a base station) for managing the communication network, or the task may be achieved in a terminal linked to the network.

A dense small cell structure is a technique for satisfying data traffic required in the future. A data transfer rate and channel capacity for the dense small cell structure are expressed by Equation 1 below.

$$R < C = m\left(\frac{W}{n}\right)\log_2\left(1 + \frac{S}{I+N}\right) \quad \text{[Equation 1]}$$

In Equation 1, m denotes the number of spatial streams, W denotes a bandwidth, and n denotes the number of users allocated to a base station.

Similarly to Equation 1, if the number (n) of users is decreased by increasing the number of base stations, a transfer rate per user may be increased.

Meanwhile, in this dense small cell structure, since a distance between base stations is decreased, a relative magnitude of interference may be increased. That is, the interference may be a more primary cause of a transfer rate decrease than a noise. Since a cell size is decreased, a user terminal experiences a frequent handover. Further, since a distance between base stations is decreased, there may be a problem in that a reception signal of a cell edge user can easily enter in a guard interval.

As such, if inter-cell inference occurs, a terminal may perform interference cancellation for suppressing or removing an interference signal.

In order for the terminal to cancel the interference, several conditions are required. First, the terminal must know a channel of the interference signal. That is, a reference signal (e.g., pilot, modulation order, etc.) of the interference signal must be known. Further, the interference signal and a reception signal must be synchronized, and if the reception signal uses orthogonal frequency division multiplexing (OFDM), the interference signal must enter in a guard interval. Further, the interference cancellation is possible only when the terminal can restore the interference signal in a state of including the reception signal. As such, if information regarding the interference signal is shared, it is preferable to restore the interference signal when a magnitude of interference is great.

That is, in order to increase an SNR of the reception signal, it is preferable that the interference signal is very weak or a magnitude of interference is great to facilitate interference cancellation.

Figure 1B:
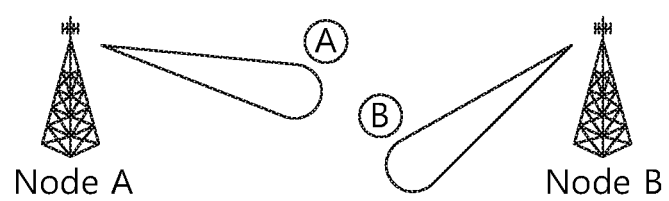
FIG. 1b shows a signal of an adjacent region between cells in case of using narrow beamforming.

FIG. 1a shows a signal of an adjacent region between cells in case of using wide beamforming, and FIG. 1b shows a signal of an adjacent region between cells in case of using narrow beamforming.

As shown in FIG. 1a and FIG. 1b, a terminal A and a terminal B may be located in a border region, that is, a cell edge region, in which there is a possibility that signals transmitted from a base station A (or node A) and a base station B (or node B) are received simultaneously.

If wide beamforming is achieved as shown in FIG. 1a, a terminal can receive a signal transmitted from the base station even if the terminal moves, thereby preferably ensuring mobility of the terminal. However, since a beam width is wide, there is a high possibility that interference occurs between signals received from the terminal A and the terminal B.

On the other hand, as shown in FIG. 1b, when beamforming is achieved with a narrow width, there is a high possibility that an interference signal is great at the occurrence of interference between signals. Therefore, if the terminal knows channel information as described above, interference cancellation is easy, which may lead to an increase in an SNR. However, if the terminal moves due to a narrow beam width, there is a high possibility that a beamforming direction of a reception signal is misaligned, which may result in a high probability that reception performance of the signal deteriorates.

Accordingly, the present invention proposes differential beamforming for transmitting a signal having a different beam width to ensure mobility of the terminal. The base station may apply beamforming differentially according to an importance of a signal to be transmitted.

Figure 2:
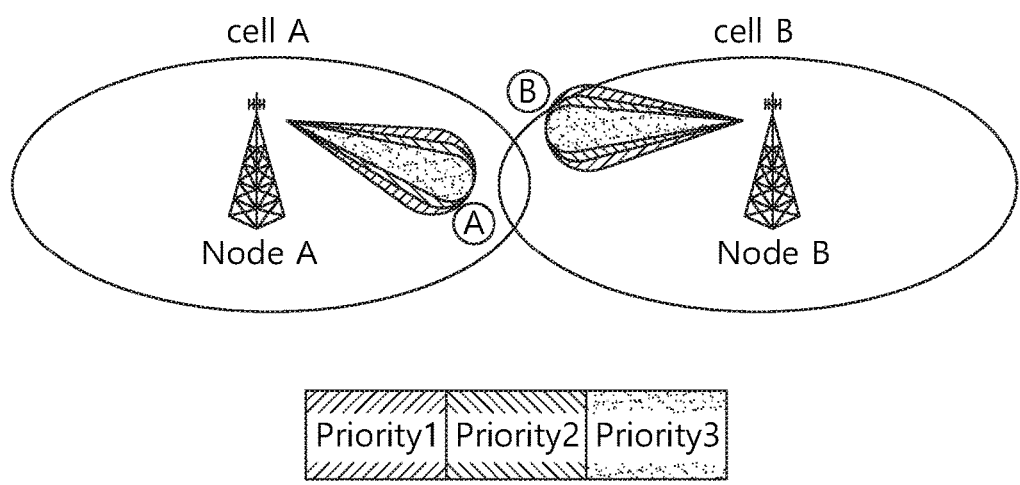
FIG. 2 is a drawing for describing differential beamforming according to an embodiment of the present invention.

FIG. 2 is a drawing for describing differential beamforming according to an embodiment of the present invention.

It is assumed that a node A manages a cell A, a node B manages a cell B, a terminal A receives a signal transmitted from the node A, and a terminal B receives a signal transmitted from the node B.

The node A and the node B may widely apply beamforming to important information to be received always by the terminal, and information to be additionally transmitted may narrow a width of beamforming step-by-step according to an importance. That is, a priority may be configured according to an importance of a signal to be transmitted, and a beam width may be adjusted according to the priority.

That is, according to the present invention, a priority is configured on the basis of an importance of data, and a signal having a different priority has a different beam width. The higher the priority, the wider the beam width. The lower the priority, the narrower the beam width.

According to one example, as shown in FIG. 2, beams may have three priorities. A beam having a first priority may be formed to be widest, and a beam having a lowest priority may be formed to be narrowest. Signals having different priorities may be allocated to orthogonal resources.

According to one embodiment of the present invention, in a channel code in which encoding data includes input data, a high priority may be assigned to an information bit, and a low priority may be assigned to a parity bit. The channel code is characterized in that a signal can be restored by using only the information bit, and a rate-compatible code can be easily generated by adjusting a length of the parity bit. In general, the information bit is more important than the parity bit in the channel code. A case where deterioration occurs while the information bit passes through a channel exhibits worse performance than a case where deterioration occurs while the parity bit passes through a channel.

Accordingly, a first priority may be assigned to the information bit which is more important information, and a second priority may be assigned to the parity bit. A beam width for a signal for the information bit may be formed by a base station to be wider than a beam width of a signal for the parity bit.

According to another embodiment of the present invention, differential beamforming may also be applied to a hierarchical video coding signal. In case of video coding including a plurality of layers, information for a base layer which is the most basic information is most important. In an enhancement layer in which coding can be achieved on the basis of the base layer, reception or decoding cannot be normally achieved when the information for the base layer is lost or deteriorates.

In video coding to which different scalabilities such as temporal scalability, spatial scalability, quality scalability, etc., are applied, a first priority which is the highest priority may be assigned to the base layer to apply the widest beamforming thereto, and as to a higher layer, a low priority may be assigned to an enhancement layer, thereby decreasing a beam width.

In addition to the aforementioned example, a beam priority may be assigned variously according to a data type and an importance. The priority may be assigned according to audio and video signals.

When differential beamforming is applied as described above according to an information importance, even if a terminal moves or channel information contained in a base station is incorrect, the terminal can receive core information. Further, if the channel information of the base station is correct, the terminal can decode an additional signal by receiving additional information, thereby improving reliability, accuracy, quality, or the like of reception information.

A beam width may be determined by a precoder used in precoding processing for processing a signal according to a specific intention in a transmitting end. That is, the beam width may be considered in a precoding matrix, and the beam width may be determined in accordance with a specific precoding index.

As shown in FIG. 2, in a cell edge region in which the cell A and the cell B are adjacent, interference may occur between a beam transmitted from the node A and a beam transmitted from the node B. In this case, the node A and the node B may allocate signals having different priorities to a border region of the cells so that an interference signal can be cancelled by the terminal A and the terminal B.

If the node A for managing the cell A allocates a high-priority signal to a specific resource, the node B for managing the neighboring cell B may allocate a low-priority signal to the resource. For example, if the node A and the node B can transmit signals with priorities 1 to N, signals allocated to a resource to which the priority 1 is assigned for the terminal A may be allocated for the terminal B in a reverse order starting from the priority N.

Figure 3A:
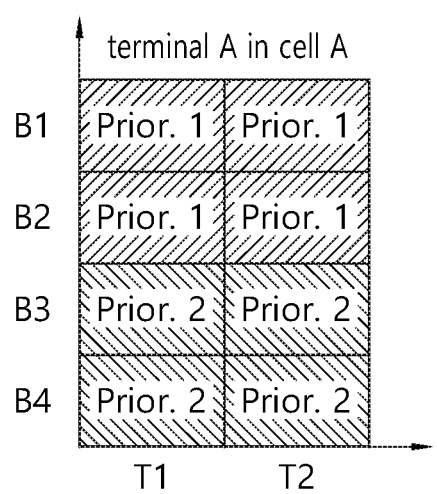
FIG. 3a shows a resource allocated to a terminal A of a cell A according to an embodiment of the present invention.
Figure 3B:
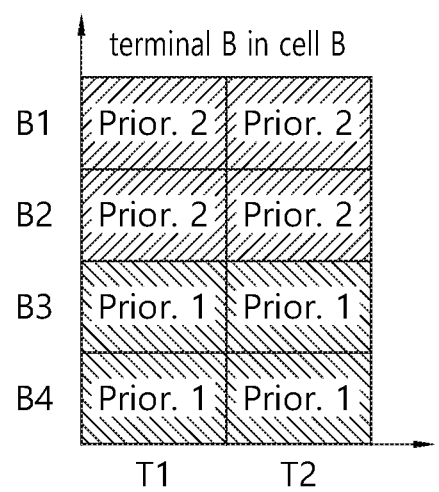
FIG. 3b shows a resource allocated to a terminal B of a cell B according to an embodiment of the present invention.

FIG. 3a shows a resource allocated to a terminal A of a cell A according to an embodiment of the present invention, and FIG. 3b shows a resource allocated to a terminal B of a cell B according to an embodiment of the present invention.

As shown, a node A may allocate signals having two priorities, i.e., a first priority and a second priority, to a band region on a time axis. In this case, a node B allocates a signal having a second priority for the terminal B to a resource to which a signal having a first priority is allocated for the terminal A, and on the contrary, allocates a signal having a first priority for the terminal B to a resource to which a signal having a second priority is allocated for the terminal A. That is, the node A and the node B allocate signals having different priorities to the same resource. As described above, the signals having the different priorities have different beam widths, which implies differential beamforming.

As such, if the different beamforming is performed, a probability that a signal of the terminal A is interfered by a signal of the terminal B is decreased.

Alternatively, even if the signal having the first priority is interfered by the signal having the second priority, strong interference may occur due to a signal having a narrow beam width. If an interference signal is strong, it is easy to cancel a signal of the terminal B when the terminal A knows a reference signal of the terminal B. Alternatively, if the terminal A receives a low-priority signal, this is advantageous for signal restoration since receive power of the signal is greater than a high-priority interference signal delivered from the node B.

Figure 4A:
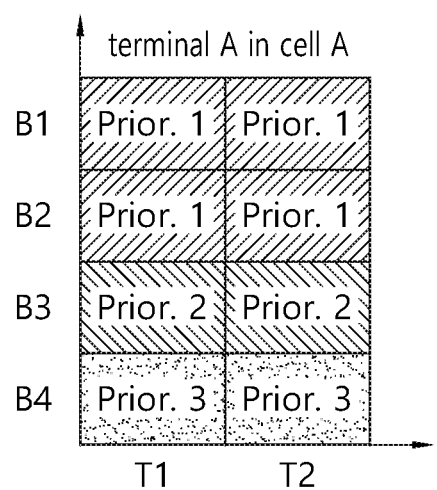
FIG. 4a shows a resource allocated to a terminal A of a cell A according to another embodiment of the present invention.
Figure 4B:
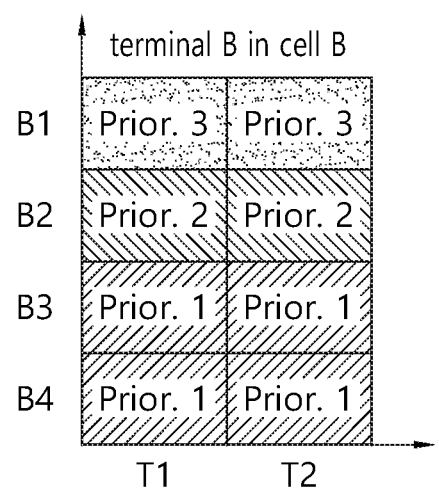
FIG. 4b shows a resource allocated to a terminal B of a cell B according to another exemplary embodiment of the present invention.

FIG. 4a shows a resource allocated to a terminal A of a cell A according to another embodiment of the present invention, and FIG. 4b shows a resource allocated to a terminal B of a cell B according to another exemplary embodiment of the present invention.

When conforming to the present embodiment, transmit power may be applied differentially according to an information importance. That is, the higher the priority of the signal, the higher the power may be allocated. For example, if the node A and the node B can transmit signals with priorities 1 to N, signals allocated to a resource to which the priority 1 is assigned for the terminal A may be allocated for the terminal B in a reverse order starting from the priority N. In this case, the higher the priority, the higher the transmit power allocated by the terminal A and the terminal B. When a high power signal is allocated from the terminal A, a low power signal is allocated to the terminal B.

As shown in FIG. 4a, the node A may allocate signals having three priorities, i.e., a first priority, a second priority, and a third priority, to a band region on a time axis. In this case, the node B allocates a signal having a second priority and a third priority for the terminal B to a resource to which a signal having a first priority is allocated for the terminal A, and on the contrary, allocates a signal having a first priority for the terminal B to a resource to which a signal having a second priority and a third priority is allocated for the terminal B.

When transmit power is allocated differentially to differential beamforming as described in the present embodiment, since strength of interference entering a high-priority signal is weak, the high-priority signal can be received reliably. Further, since strength of interference entering a low-priority signal is strong, interference cancellation is easy when a terminal knows channel information of an interference signal.

Figure 5:
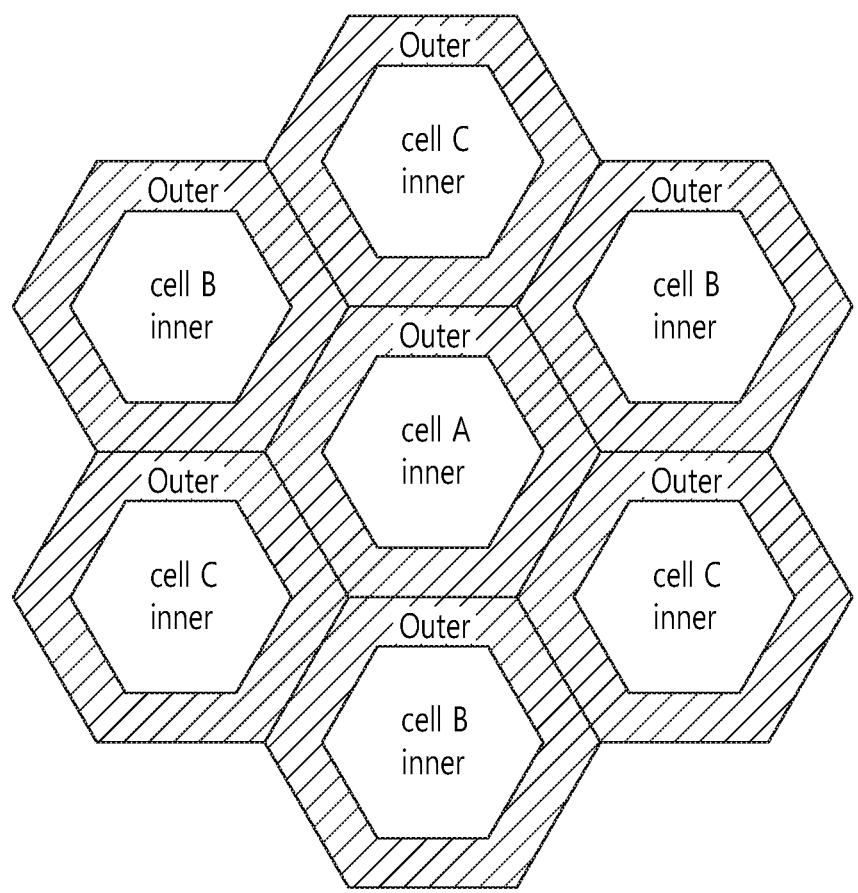
FIG. 5 is a schematic view for describing cells located adjacent to each other according to the present invention.

FIG. 5 is a schematic view for describing cells located adjacent to each other according to the present invention. As shown, a cell B and a cell C are adjacent to each other in a triangular structure with a cell A in a center.

Individual base stations for managing the respective cells use a pre-set frame structure to deploy signals having different priorities to the same resource.

A resource provided to each cell is divided into an inner resource having a low possibility of signal interference and an outer resource expected to have inter-cell interference. In the present invention, the inner resource indicates a resource provided to an area inside the cell, and the outer resource indicates a resource provided to a cell border, a cell edge region, and an adjacent region between cells. A resource of the cell may be utilized in a manner of a fractional frequency reuse in which the resource is divided into the inner resource and the outer resource, and a fractional frequency allocated to the outer resource may be allocated to signals having a plurality of priorities. However, when conforming to the present invention, although the resource is divided into the inner resource and the outer resource, all cells can use all frequency resources instead of fractionally utilizing the frequency resource.

FIG. 6 shows a resource allocation frame structure according to an embodiment of the present invention.

In FIG. 6, a horizontal direction indicates a resource block, and a vertical direction indicates a resource block (RB) allocated to each cell.

Resources having a plurality of priorities are allocated to a cell A and a cell B, and an inner resource provided to an inner region is allocated to a cell C. As illustrated, if a base station A governing the cell A allocates a signal having a priority n, where n is any one number in the range of 1 to N, a base station B governing the cell B allocates a resource having a priority N+1−n to the resource.

That is, the base station A and the base station B may perform beamforming such that signals having different priorities can be allocated to the same resource, and may allocate the resource such that a difference of the priorities is as great as possible. The base station B may allocate a signal having the priority N to a resource to which the base station A allocates a signal having a priority 1, and the base station B may allocate the signal having the priority 1 to a resource to which the base station A allocates the signal having the priority N. The base stations allocate the resource allocated on the basis of a pre-configured resource allocation frame as shown in FIG. 6, and thus the priority may be configured in association with a cell ID.

The resource allocated by the base station A and the base station B may be an outer resource or an inner resource.

If more users are present in an inner region and thus inner signals are more allocated, signals of the inner resource may be additionally assigned to the same resource. A column in which the inner resource is allocated to all cells may be added to FIG. 6.

If a signal having a low priority is beamformed with a narrow width, an arrival distance of the signal is increased and thus a beam of the narrow beam may cause interference to a region to which an inner resource is allocated as shown in the cell C. In this case, the base station C governing the cell C may perform frequency hopping on a signal of the inner resource. Since this may lead to a change in a frequency channel, it is possible to decrease a probability that the signal of the inner resource overlaps with a low-priority signal causing interference.

Unlike a terminal to which the outer resource is allocated, a terminal of the cell C to which the inner resource is allocated does not have information capable of cancelling interference caused by a neighboring cell (e.g., a reference signal of a reference signal), and thus it is difficult to cope with the interference. Accordingly, a base station of a corresponding cell may use frequency hopping to change a terminal to which the resource is allocated, thereby decreasing interference which occurs in the terminal.

FIG. 7 shows a resource allocation frame structure according to another embodiment of the present invention.

In FIG. 7, a horizontal axis indicates a resource, and a signal of each cell allocated to the same resource is indicated by a pattern.

As illustrated, according to the present embodiment, a resource is divided into an inner resource and an outer resource, and the outer resource is divided according to a priority. The resource may be divided into the inner resource and the outer resource through a power control similarly to a partial frequency reuse, or may be divided according to an elevation angle of vertical beamforming. That is, if the elevation angle is great and thus a beam is directed to an inner cell, it may be regarded as the inner resource.

According to a pattern 1, if an outer resource having a first priority is allocated to a resource 1 for a cell A, an outer resource having a second priority is allocated for a cell B. The inner resource is allocated to a cell C.

The inner resource may be allocated to one cell for the same resource similarly to the pattern 1, a pattern 2, and a pattern 3. If many inner resources are required due to many users of the inner region, the inner resource may be allocated to all cells similarly to a pattern 4 and a pattern 5.

FIG. 8 shows a resource allocation frame structure according to another embodiment of the present invention.

In FIG. 8, AI-k denotes a terminal k to which an inner resource of a cell A is allocated, and AO-k denotes a terminal k to which an outer resource of the cell A is allocated. Similarly, BI-k denotes a terminal k to which an inner resource of a cell B is allocated, and BO-k denotes a terminal k to which an outer resource of the cell B is allocated. CI-k denotes a terminal k to which an inner resource of a cell C is allocated, and CO-k denotes a terminal k to which an outer resource of the cell C is allocated.

When interference is caused by a terminal located in an outer region, if it is interference for a signal of an outer signal, in particular, a second-priority signal having a small beam width, the terminal may have information on an interference signal. However, a terminal located in an inner region to receive a signal for an inner resource does not have information on an interference signal causing interference, and thus interference cancellation is difficult.

In order to avoid interference which may be caused by the terminal located in the inner region, according to the present embodiment, a base station C performs scheduling for changing a user when the inner resource is allocated, that is, performs frequency hopping for moving a resource from a first terminal CI-1 to a second terminal CI-2.

Accordingly, the terminal may more stably receive signals having first and second priorities of the outer resource and a signal of the inner resource.

When the second-priority signal of the outer resource is hopped, a terminal interfered from the second-priority signal is newly generated, and the terminal must receive interference information for decoding the interference signal. However, since the signal of the inner resource does not have to be decoded, if the inner resource is hopped, an overhead for signal exchange does not occur.

FIG. 9a and FIG. 9b show a resource allocation frame structure according to another embodiment of the present invention. In FIG. 9a and FIG. 9b, a horizontal axis denotes an orthogonal resource, and a vertical axis denotes a signal allocated to the same resource for each cell.

Referring to FIG. 9a and FIG. 9b, according to the present embodiment, an inner resource may also be allocated by being divided on the basis of a priority similarly to an outer resource. As shown in FIG. 9a, a signal having a second priority is allocated to an inner resource in a pattern 1, a pattern 2, and a pattern 3, and as shown in FIG. 9b, a signal having a first priority is allocated to an inner resource in a pattern 1, a pattern 2, and a pattern 3. If the inner resource is required more, a pattern 4 or a pattern 5 may be further assigned.

If the inner resource is divided according to a priority, a signal of an inner resource having a high priority is preferably assigned not to overlap with an outer resource of a signal having a low priority of a neighboring cell in order to decrease interference caused by the signal having the low priority.

According to the resource allocation frame structure of FIG. 9a, similarly to the pattern 4, since each cell shares an inner resource having a first priority, there is a small probability that interference is caused by a neighboring cell. Further, since a signal of a second-priority inner resource having a sharp beam width may cause interference to a signal of a first-priority outer resource, the resource allocation frame structure of FIG. 9a is characterized in that the signal of the inner resource can be more stably received than the signal of the outer resource.

Meanwhile, according to the resource allocation frame structure of FIG. 9b, since the inner resource having the first priority and the outer resource having the first priority are allocated to the same resource, there is a low possibility that the inner resource having a wide beam width causes interference to the signal of the outer resource. In the pattern 4, since the signal of the inner resource having the second priority is allocated to the same resource in the pattern 4, beams having narrow widths are formed and thus there is a low possibility that interference occurs. That is, the resource allocation frame structure of FIG. 9b is characterized in that the signal or the outer resource can be more stably received than the signal of the inner resource.

A base station may allocate a resource by selecting the resource allocation frame structure according to a signal intended to be stably received.

FIG. 10 shows a resource allocation frame structure according to another embodiment of the present invention.

In the resource allocation frame structure of FIG. 10, frequency hopping is achieved on a signal of an inner resource when an inner resource having a plurality of priorities is allocated. As illustrated, it is shown in FIG. 10 that an inner resource having a second priority is hopped in the resource allocation frame structure of FIG. 9a.

In FIG. 10, AI-k denotes a terminal k to which an inner resource of a cell A is allocated, and AO-k denotes a terminal k to which an outer resource of the cell A is allocated. Similarly, BI-k denotes a terminal k to which an inner resource of a cell B is allocated, and BO-k denotes a terminal k to which an outer resource of the cell B is allocated. CI-k denotes a terminal k to which an inner resource of a cell C is allocated, and CO-k denotes a terminal k to which an outer resource of the cell C is allocated.

Similarly to a column 4 of FIG. 10, since a terminal of each cell shares a first-priority inner resource, there is a small probability that interference is caused by an outer resource. Further, a signal of a second-priority outer resource having a wide beam width is not significantly influenced by a second-priority signal of the inner resource. Accordingly, the resource allocation frame structure of FIG. 10 corresponds to a structure capable of more stably receiving a first-priority signal of the outer resource and the second-priority signal of the inner resource.

In this resource allocation structure, when the second-priority signal of the outer resource is hopped, a new terminal interfered from the hopped second-priority signal must receive information for decoding an interference signal to cancel the interference. However, since the terminal for receiving the second-priority signal of the inner resource does not have to decode the interference signal, an overhead for signal exchange does not occur.

FIG. 11 shows a resource allocation frame structure according to another embodiment of the present invention.

As shown in FIG. 11, in the resource allocation frame structure according to the present embodiment, more resources are allocated to a signal having a high priority. Each base station may allocate more resources to the high-priority signal. Since the high-priority signal has a wide beam width, reception signal strength of a terminal may become weak. A disadvantage in which signal strength becomes weak may be compensated by allocating more resources to the high-priority signal. In this case, however, it is preferable that the same-priority signals are assigned to the same resource to a minimum extent possible.

Referring to FIG. 11, a signal having a first priority, a signal having a second priority, and a signal of an inner region are allocated to each cell, and thereafter the signal having the first priority is allocated to an outer region of each cell. That is, the signal having the first priority is allocated to more resources than the signal having the second priority. The first-priority signal to which more resources must be allocated is assigned together with an inner resource of another cell so that interference to another signal does not occur.

In order for the signal having the first priority to be more allocated, a column 4 to a column 6 of FIG. 11 may be additionally repeated.

Further, if more inner resources must be provided, an inner signal may be additionally assigned to the same resource similarly to a column 7.

FIG. 12 and FIG. 13 show a case where a signal of an inner resource has a plurality of priorities in the resource allocation frame structure of FIG. 11.

In case of FIG. 12, since a signal having a first priority of an inner resource is assigned together with an outer resource having a first priority, less interference is caused by an outer signal. Therefore, the resource allocation frame structure of FIG. 12 is characterized in that the signal of the inner resource having the first priority can be more stably received than the outer resource.

On the other hand, in case of FIG. 13, since the inner resource having the first priority and the outer resource having the first priority are allocated to the same resource, there is a small possibility that the inner resource having a wide beam width causes interference to the signal of the outer resource, and since the signals of the outer resource having the first priority and the inner resource of another cell are allocated to the same resource in a column 4 to a column 6, there is a small possibility that interference to the outer resource occurs. That is, the resource allocation frame structure of FIG. 13 is characterized in that the signal of the outer resource can be more stably received than the signal of the inner resource.

FIG. 14 shows a resource allocation frame structure according to another embodiment of the present invention.

It is shown in FIG. 14 that a signal of an inner resource is frequency-hopped in the resource allocation frame structure of FIG. 11.

In FIG. 14, AI-k denotes a terminal k to which an inner resource of a cell A is allocated, and AO-k denotes a terminal k to which an outer resource of the cell A is allocated. Similarly, BI-k denotes a terminal k to which an inner resource of a cell B is allocated, and BO-k denotes a terminal k to which an outer resource of the cell B is allocated. CI-k denotes a terminal k to which an inner resource of a cell C is allocated, and CO-k denotes a terminal k to which an outer resource of the cell C is allocated.

When a second-priority signal of the outer resource is hopped, a new terminal interfered from the hopped second-priority signal must receive information for decoding an interference signal to cancel the interference. However, since the terminal for receiving the second-priority signal of the inner resource does not have to decode the interference signal, an overhead for signal exchange does not occur.

FIG. 15 shows a resource allocation frame structure according to another embodiment of the present invention.

As shown in FIG. 15, according to the present invention, a resource may be divided into an inner resource and an outer resource, and the outer resource may be divided into signals having three priorities. If a signal of a first priority is allocated to a specific cell, a signal having a third priority may be allocated to a neighboring cell, and the inner resource may be allocated to another neighboring cell. Alternatively, if a signal having a second priority is allocated to a specific cell, the inner resource may be allocated to another neighboring cell.

If it is assumed that a terminal for receiving the first-priority signal has information for decoding the third-priority signal allocated to the same resource, the terminal may cancel interference by decoding the third-priority signal.

In the frame structure of FIG. 15, frequency hopping for the inner resource may also be performed.

FIG. 16 shows a resource allocation frame structure according to another embodiment of the present invention.

It is shown in FIG. 16 that more resources are allocated to a signal having a high priority in the resource allocation frame structure of FIG. 15. Each base station may allocate more resources to the high-priority signal. Since the high-priority signal has a wide beam width, reception signal strength of a terminal may become weak. A disadvantage in which signal strength becomes weak may be compensated by allocating more resources to the high-priority signal. In this case, however, it is preferable that the same-priority signals are assigned to the same resource to a minimum extent possible.

Referring to FIG. 16, as shown in a pattern 1 to a pattern 3, a signal having a first priority, a signal having a third priority, and a signal of an inner region are allocated to each cell, and according to a pattern 4 to a pattern 7, a signal having a first priority, a signal having a second priority, and a signal of an inner region are allocated to each cell. That is, more signals for the first priority are allocated to each cell than the signal for the second priority and the signal for the third priority.

According to another embodiment, the first-priority signal to which more resources must be allocated may be assigned together with an inner resource of another cell so that interference to another signal does not occur.

In addition, if more inner resources must be provided, a signal of the inner resource may be additionally assigned to the same resource similarly to a pattern 7.

Figure 17:
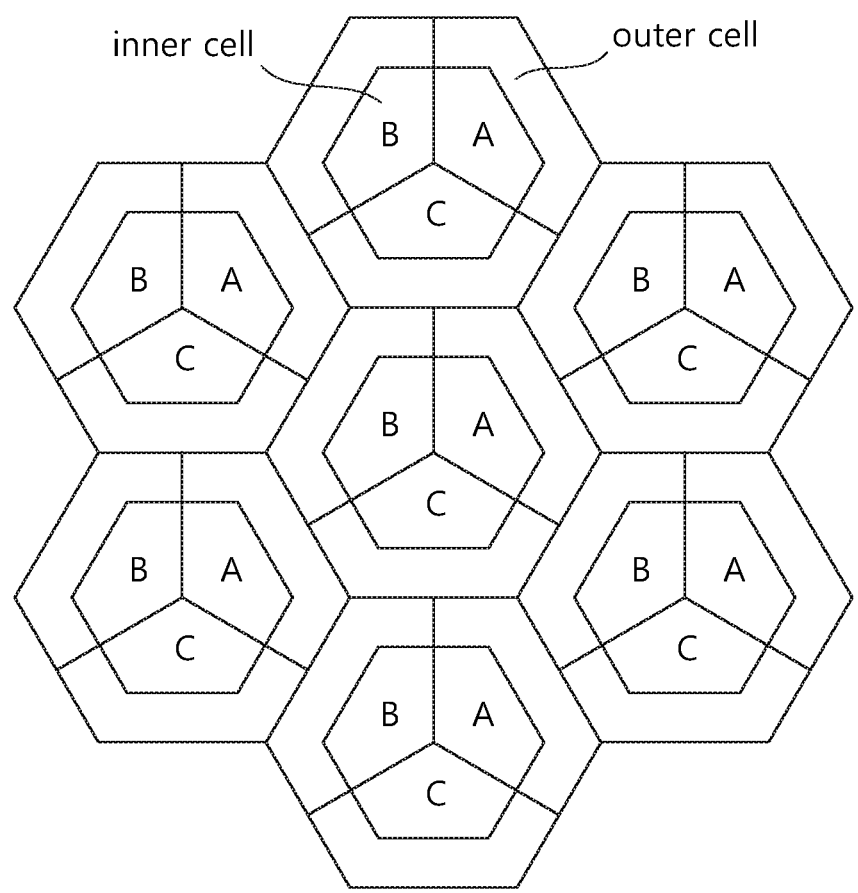
FIG. 17 is a schematic view for explaining cells located adjacent to each other according to another embodiment of the present invention.

FIG. 17 is a schematic view for explaining cells located adjacent to each other according to another embodiment of the present invention.

As illustrated, each cell may exist within a cell subdivided inside a hexagon. In comparison with FIG. 5, a subdivided region of one hexagon may be divided as a cell, rather than one cell is formed in one hexagon. A cell A, a cell B, and a cell C are located adjacent to each other.

A small hexagon of FIG. 17 indicates an inner region to which an inner resource is allocated, that is, indicates an inner cell, and a large hexagon indicates an outer region to which an outer resource is allocated, that is, indicates an outer cell.

A terminal located in each cell of FIG. 17 may receive a signal based on the frame structure described above in FIG. 6 to FIG. 16.

Figure 18:
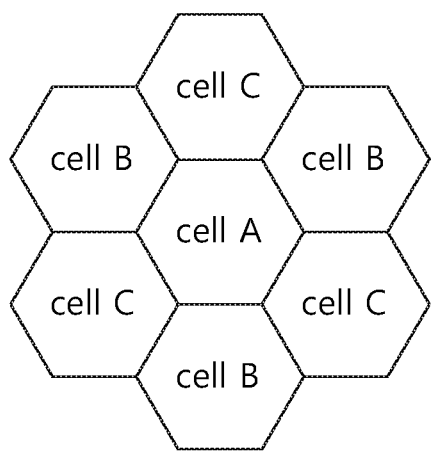
FIG. 18 is a schematic view for explaining cells located adjacent to each other according to another embodiment of the present invention.

FIG. 18 is a schematic view for explaining cells located adjacent to each other according to another embodiment of the present invention.

As illustrated, each region forms one cell without being divided into an inner cell and an outer cell. Each of a cell A, a cell B, and a cell C are located adjacent to each other, and according to the present embodiment, a signal having a plurality of priorities may be allocated to one cell without being divided into an inner resource and an outer resource.

FIG. 19 shows a resource allocation frame structure according to another embodiment of the present invention.

The frame structure of FIG. 19 is for a signal to be allocated, when a resource to be allocated to a cell as shown in FIG. 18 is not divided into an inner resource and an outer resource.

As illustrated, a signal having a priority may be allocated to each cell, and a high-priority signal may be allocated to the same cell as a low-priority signal.

In FIG. 19, if a first-priority signal is allocated to a cell B and a cell C in a column 2 and the first-priority signal is allocated again to the cell C similarly to a column 4, the first-priority signal is allocated to a cell A other than the cell C. That is, if high-priority signals overlap with each other, the signals may be assigned not to repetitively overlap in the same cell.

FIG. 20 shows a resource allocation frame structure according to another embodiment of the present invention.

In FIG. 20, a resource is not divided into an inner resource and an outer resource as shown in the frame structure of FIG. 19. According to the frame structure of FIG. 20, a second-priority signal is allocated more than a first-priority signal. The second-priority signal may be allocated to two cells in the same resource, and the second-priority signal may be allocated to all cells similarly to a column 4. If the second-priority signal is more provided additionally, the column 4 may be repetitively assigned.

If the first-priority signal is more allocated than the second-priority signal, the allocation may be achieved by changing a second priority and a first priority in the frame structure of FIG. 20.

FIG. 21 shows a resource allocation frame structure according to another embodiment of the present invention.

As shown in FIG. 15, according to the present embodiment, a resource may be divided into a signal having three priorities. If a first-priority signal is allocated to a specific cell, a second-priority signal may be allocated to a neighboring cell, and a third-priority signal may be allocated to another neighboring cell. If there are many signals having a specific priority, a column to which the signal having the specific priority is allocated to the same cell may be added.

If it is assumed that a terminal which receives the first-priority signal has information for decoding the second-priority signal and third-priority signal allocated to the same resource, the terminal may decode the second-priority signal and the third-priority signal to cancel interference.

Figure 22:
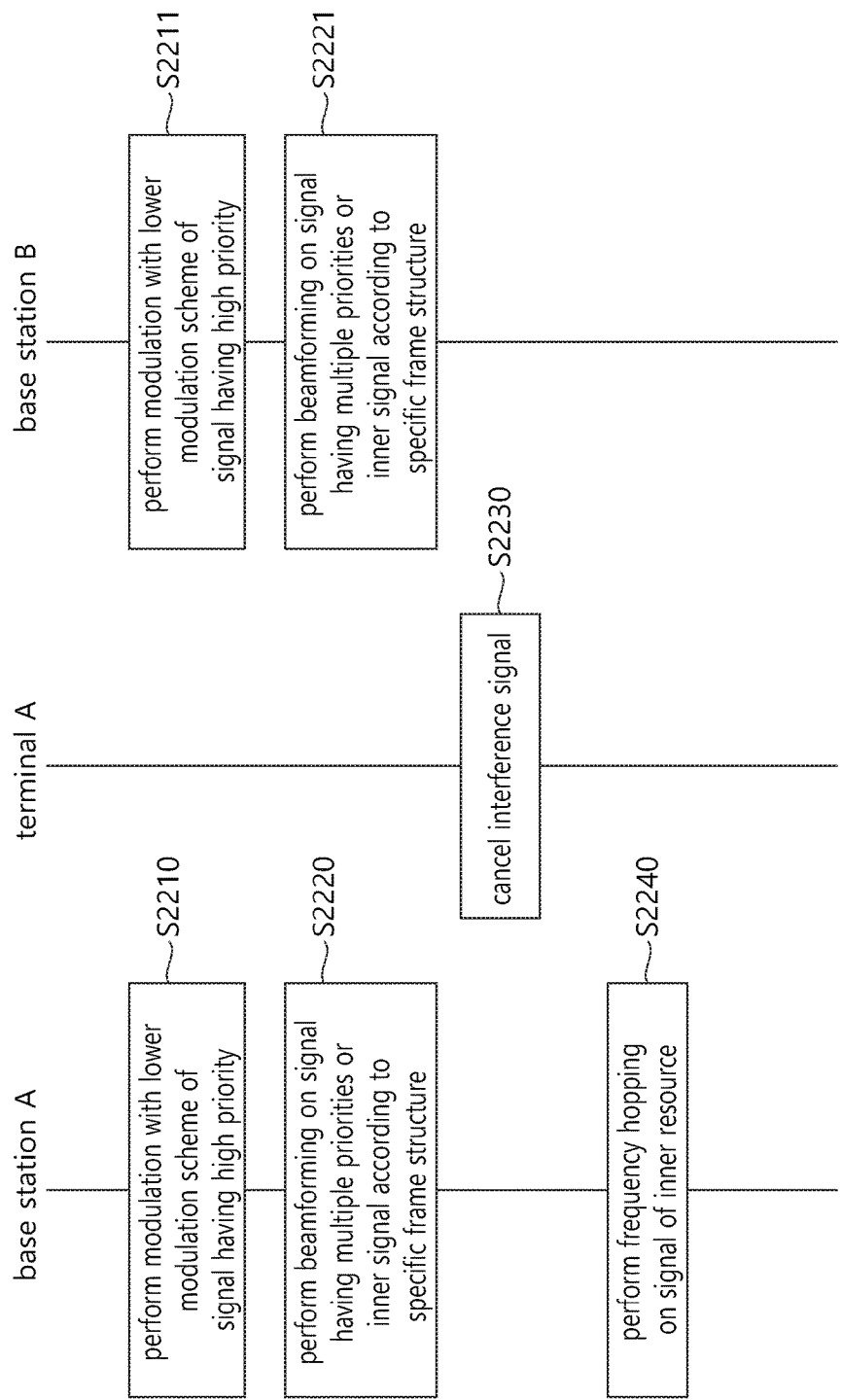
FIG. 22 is a flowchart for controlling resource allocation and signal processing according to the present invention.

FIG. 22 is a flowchart for controlling resource allocation and signal processing according to the present invention. A resource allocation method of a base station and a signal processing method of a terminal are described as follows with reference to FIG. 22. For convenience of explanation, it is assumed that a base station A and a base station B may provide a signal having a plurality of priorities to a terminal A, and it is also assumed that the terminal A is a terminal which primarily receives a signal of a cell A in a region adjacent to the cell A governed by the base station A and a cell B governed by the base station B.

First, the base station A and the base station B may adjust a modulation scheme of a signal differently for differential beamforming according to a priority. That is, the base station A and the base station B perform modulation in such a manner that a signal having a high priority is modulated with a lower modulation scheme than a signal having a low priority (S2210, S2211). The priority may be determined according to an importance of the signal, that is, an importance of data. The higher the priority, the wider the beam width configured to ensure mobility of the terminal.

The base station A and the base station B may divide at least one of an outer resource and an inner resource into a signal having a priority. That is, the base station A and the base station B may divide the outer resource as the signal having the priority, and may divide both of the outer resource and the inner resource as the signal having the priority.

If the high-priority signal is more widely beamformed than the low-priority signal, strength of the low-priority signal having a relatively narrow beam width is greater than strength of the high-priority signal. Accordingly, in order for the terminal to stably receive the high-priority signal, the high-priority signal is preferably modulated with a low modulation scheme.

According to another embodiment of the present invention, if the modulation scheme of the high-priority signal is decreased as described above, the base station A and the base station B allocate more resources to the high-priority signal by a level of decreasing the modulation scheme, so that the low-priority signal is transmitted in the same amount as a data amount to be transmitted.

Thereafter, the base station A and the base station B perform beamforming on a signal having a plurality of priorities or an inner signal according to a pre-configured frame structure for the resource allocation (S2220, S2221).

The resource allocation frame structure includes information regarding a priority of a first beam to be formed by the base station A and a priority of a second beam to be formed by the base station B. Each base station does not allocate the same-priority signal to the same resource. Accordingly, resource allocation is possible with easy interference cancellation.

While receiving the first beam and the first-priority signal transmitted from the base station A, if the terminal A receives the second beam and the second-priority signal transmitted from the base station B, the terminal A may cancel interference on the second beam by using reference information regarding the second beam (S2230). Since the second beam has a low priority and thus is formed in a sharp shape in which a beam width is narrow, an interference magnitude is great. In this case, a signal for the second beam may be easily recovered by using reference information.

If a signal of an inner resource is beamformed in the base station A, the base station A may perform frequency hopping on the signal of the inner resource (S2240). Unlike a terminal to which the outer resource is allocated, the terminal A which receives the signal of the inner resource does not have information (e.g., a reference signal of an interference signal) capable of cancelling interference caused by a neighboring cell, and thus has a difficulty in coping with interference. Accordingly, the base station A of a corresponding cell may decrease interference caused by the terminal A by changing a terminal to which a resource is allocated through frequency hopping.

Although FIG. 22 is described from a perspective of the terminal A for convenience of explanation, it is also equally applicable to a terminal B and the base station B.

As described above, the present invention proposes a resource allocation method capable of stably receiving a signal even when a mobile terminal is located at a cell edge, that is, an adjacent region between cells, in a dense small cell structure. For this, beamforming having a plurality of beam widths may be performed, and the beam width may be determined according to an importance of a signal. Neighboring base stations may allocate resources orthogonal to each other according to a pre-configured resource frame structure, and may adjust a signal modulation scheme or a power amount or a resource allocation amount according to a priority.

In addition, according to the present invention, since a signal for an inner resource is subjected to frequency hopping, a signal interference probability can be decreased.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. A resource allocation method comprising:
   allocating, by a first base station operating in a first cell, a first signal of an outer resource of the first cell to a resource based on a resource allocation frame structure for a terminal, the first signal having a first beam width;
   allocating, by a second base station operating in a second cell adjacent to the first cell, a second signal of an outer resource of the second cell to the resource for the terminal, the second signal having a second beam width which is different from the first beam width;
   wherein the first signal has a first priority, and the second signal has a second priority different from the first priority, and
   wherein the first priority is higher than the second priority, and the first beam width is greater than the second beam width;
   allocating, by a third base station operating in a third cell adjacent to the first cell and the second cell, a third signal of an inner resource of the third cell to the resource for the terminal; and
   performing, by the third base station, frequency hopping on the third signal of the inner resource of the third cell to change the terminal allocated to the resource to a different terminal when the third signal of the inner resource overlaps with the second signal of the outer resource of the second cell.

2. The resource allocation method of claim 1, wherein transmit power of the first signal is higher than transmit power of the second signal.

3. The resource allocation method of claim 1,
   wherein the third signal allocated to the inner resource comprises signals having a plurality of priorities, and
   wherein the frequency hopping is performed on a signal having a low priority among the signals allocated to the inner resource.

4. The resource allocation method of claim 1, wherein the first base station and the second base station allocate more resources to the first signal having the first priority than to the second signal having the second priority.

* * * * *